United States Patent [19]
Dopke et al.

[11] Patent Number: 5,924,839
[45] Date of Patent: Jul. 20, 1999

[54] REARRANGEMENT METHOD AND APPARATUS

[75] Inventors: Karl-Heinz Dopke, Rahden; Siemen Garlichs, Espelkamp; Horst Rathert, Minden, all of Germany

[73] Assignee: Kolbus GmbH & Co. KG, Rahden, Germany

[21] Appl. No.: 08/108,986

[22] Filed: Aug. 18, 1993

[30] Foreign Application Priority Data

Aug. 20, 1992 [DE] Germany ............................ 42 27 478

[51] Int. Cl.[6] .......................... B65G 59/02; B42C 19/08
[52] U.S. Cl. ..................................... 414/796; 414/796.8
[58] Field of Search ................... 414/795.8, 796, 414/796.8

[56] References Cited

U.S. PATENT DOCUMENTS

| | | | |
|---|---|---|---|
| 3,339,710 | 9/1967 | Micgielse et al. | |
| 3,664,522 | 5/1972 | Goto | 414/796 |
| 4,119,219 | 10/1978 | Marschke | 414/796 |
| 5,018,940 | 5/1991 | Hognestad et al. | 414/796.8 |

FOREIGN PATENT DOCUMENTS

| | | |
|---|---|---|
| 19 57 283 | 12/1966 | Germany . |
| 21 00 613 | 8/1971 | Germany . |
| 25 56 103 | 6/1976 | Germany . |
| 26 19 156 | 11/1977 | Germany . |
| 28 04 781 | 8/1979 | Germany . |
| 40 30 847 | 4/1992 | Germany . |
| 56-23128 | 3/1981 | Japan . |
| 63-171729 | 7/1988 | Japan ..................................... 414/796 |

*Primary Examiner*—Andres Kashnikow
*Attorney, Agent, or Firm*—Alix, Yale & Ristas, LLP

[57] ABSTRACT

The order in which printing work products, such as finished books, book blocks and other similar objects, are transported is rearranged intermediate serially arranged entry and discharge conveyors. In a destacking mode of operation, stacks of products are positioned at an intermediate destacking station and the product which is uppermost in the stack is separated from the stack and delivered onto the receiving end of the discharge conveyor, the receiving end of the discharge conveyor being caused to move vertically in steps so as to remain in position to receive individual products as the stack height is reduced. In an alternative operational mode, the level of the discharge conveyor is fixed and the discharge end of the entry conveyor is vertically moved in stepwise fashion with a support platform of the destacking station such that, when control over the last product of a stack is transferred to the discharge conveyor, the transfer of a new stack into the destacking station can occur as the support platform is returned to its starting position.

20 Claims, 2 Drawing Sheets

REARRANGEMENT METHOD AND APPARATUS

BACKGROUND OF THE INVENTION

1. Field of the Invention

The present invention relates to the transporting, with an included rearrangement in order, of objects and particularly to the stacking or destacking of relatively fragile book blocks, books or like products. More specifically, this invention is directed to apparatus for altering the order of objects being conveyed between a pair of locations and especially to apparatus which either separates individual printing work products from previously formed stacks of such products, and thereafter conveys the separated products to a downstream utilization station, or receives a serial stream of such printing work products and rearranges the received products in stacks of preselected height. Accordingly, the general objects of the present invention are to provide novel and improved methods and apparatus of such character.

2. Description of the Prior Art

While not limited thereto in its utility, the present invention is particularly well suited for use in the continuous feeding, to a downstream distribution or utilization station, of individual printing works products such as book blocks, books and similar products. It is common practice in the art to form such printing work products into stacks for temporary storage. When further use of the thus stacked products is required, the products must be destacked and serially conveyed to a downstream work station. The previously available destacking methods and apparatus have had a number of inherent deficiencies including a comparatively high degree of mechanical complexity, and thus less than the desired reliability, relatively high cost and a relatively slow product throughput rate.

Published German patent application 28 04 781 discloses a book destacking method and apparatus in which stacked printing work products, after supply and acquisition, are moved vertically. The individual books are laterally ejected from the upwardly moving stack upon becoming the uppermost book in the stack and reaching the level of a discharge conveyor. The apparatus of this published German application comprises a lower supply conveyor belt, an upwardly extending paternoster with stack supports mounted thereon, a push-off device located above the paternoster and having push-off fingers, and an upper discharge conveyor. The push-off device supplies the individual books to the upper conveyor, for transport to the downstream utilization station, as they become the uppermost book in the stack as a result of the elevation of the stack supported on the paternoster.

Continuing to discuss the apparatus of German application DOS 28 04 781, the paternoster comprises a frame and chains which run in lateral guides. Cooperating pairs of bar-shaped supports are mounted on the chains at predetermined intervals with the supports of each pair facing one another. The spacing between the lateral guides for the chains may be adjusted to suit different book sizes through the use of spindles mounted in transversely oriented members of the frame.

The apparatus disclosed in German patent application DOS 28 04 781 is designed to destack books gently, so as to avoid damage thereto, and is intended especially for destacking books to which protective jackets have already been applied. The risk of damage to the books being destacked is minimized by acting upon the books from above during separation from the stack. However, the book destacking apparatus of the published German application is comparatively expensive, due to the need to provide a vertical transport system between the lower, entry conveyor and the upper, discharge conveyor. The inclusion of the vertical transport system also dictates a relatively complex mechanical design, which inherently diminishes reliability, and the recycling time of the vertical transport imposes an upper limit on book throughput rate.

SUMMARY OF THE INVENTION

The present invention overcomes the above-briefly discussed and other deficiencies and disadvantages of the prior art by providing a novel technique for the stacking or destacking of book blocks, books and similar products. The present invention also encompasses apparatus for use in the practice of this novel method, such apparatus being characterized by an uncomplicated design, by being comparatively inexpensive to manufacture and operationally reliable, and by having the capability of achieving high performance in terms of product throughput rate.

Destacking apparatus in accordance with the present invention includes an entry conveyor, a separating system and an exit conveyor. The entry conveyor transports product stacks, one after another, to a separating mechanism, i.e., to the destacking station. The product which is at a given instant uppermost in the stack located at the destacking station will be separated from the product on which it is resting. The exit conveyor will serially acquire the individual products which are separated from the stack and cause such acquired products to be transported away from the separating mechanism.

In accordance with a first embodiment of the invention, the product receiving end of the exit conveyor is automatically caused to move vertically relative to the stack support level of the destacking station to reposition the exit conveyor, in step-wise fashion, to acquire the uppermost product of the stack being disassembled. In accordance with a second embodiment of the invention, the stack support at the destacking station and the discharge end of the entry conveyor are caused to move together in a first vertical direction during destacking and in the opposite vertical direction during infeed of a new stack.

BRIEF DESCRIPTION OF THE DRAWINGS

The present invention may be better understood and its numerous objects and advantages will become apparent to those skilled in the art by reference to the accompanying drawings wherein like reference numerals refer to like elements in the two figures and in which.

DESCRIPTION OF THE DISCLOSED EMBODIMENTS

Figure 1:
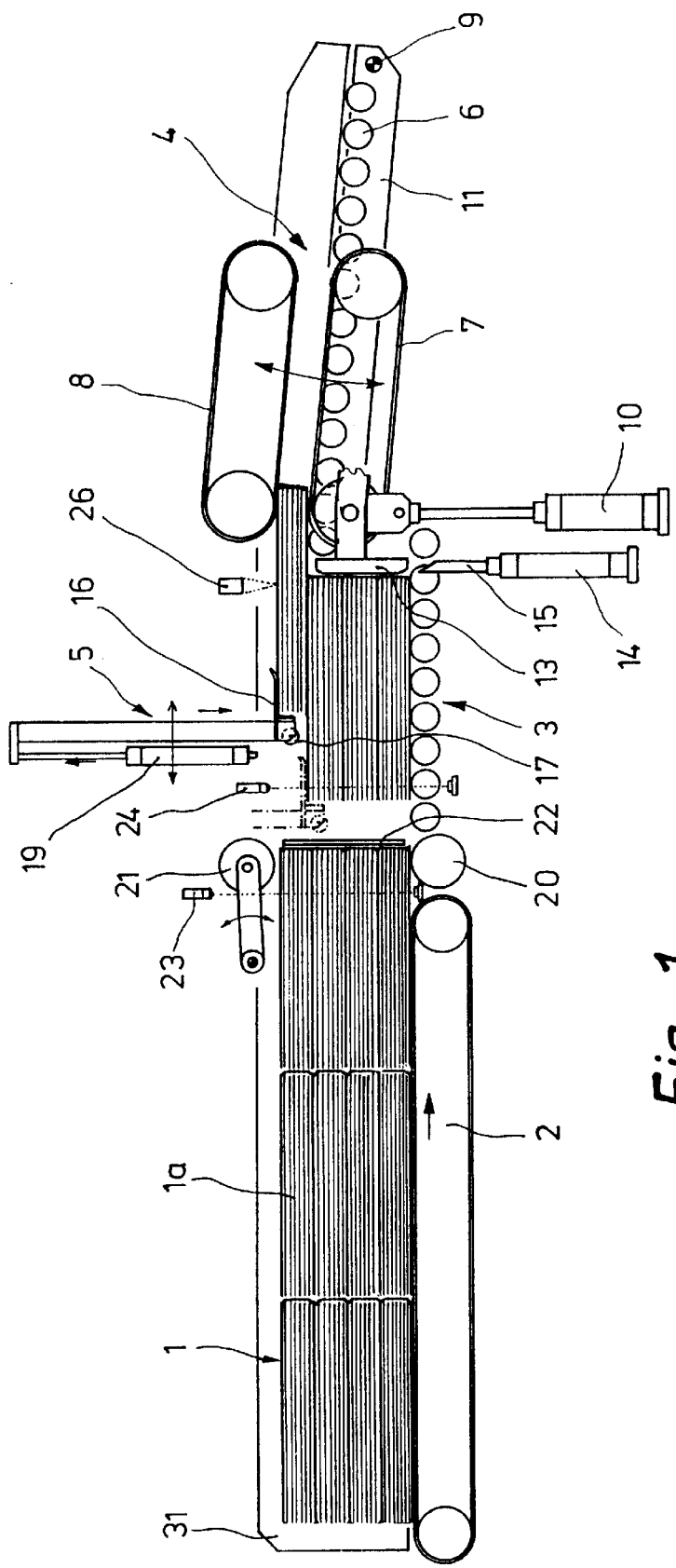
FIG. 1 is a schematic, side elevation view of apparatus in accordance with a first embodiment of the invention.

With reference first to FIG. 1, the apparatus shown is intended for use in the destacking of previously formed stacks of book blocks, indicated generally at 1, which are comprised of individual book blocks 1a. Thus, the object of the apparatus is to receive, on an entry conveyor 2, a series of the stacks 1 and to discharge, on an exit conveyor indicated generally at 4, a continuous stream of individual book blocks 1a. A destacking station, which includes a first roller-type conveyor indicated generally at 3, is interposed between entry conveyor 2 and exit conveyor 4. The destacking station also includes an ejection or separation mechanism, indicated generally at 5, which pushes the uppermost book block 1a from the stack 1 which is positioned at the destacking station.

In the FIG. 1 embodiment, the entry conveyor 2 includes a support or guide member 31 and may be inclined transversely with respect to the transport direction. The angle of inclination may, for example, be 20°. Thus, insurance against misalignment of the stacks 1 may be provided by having the moving stacks guided on an inclined support surface and a similarly inclined support surface is provided for the exit conveyor. The transport path is thus an inclined plane. As may be seen from the drawing, the book blocks 1a are transported with their spines facing in the downstream direction.

The exit conveyor 4 includes a frame 11 which supports a second roller-type conveyor 6. Conveyor 6 will typically be comprised of a pair of roller tracks which are laterally offset relative to the roller track(s) comprising conveyor 3. Exit conveyor 4 further includes a book block acquisition device defined by cooperating pairs of driven, endless conveyor belts 7, 8. The lower belts 7 of the acquisition device are positioned with their upper runs located at the transport level defined by roller conveyor 6. The upper conveyor belts 8 of the acquisition device also driven in synchronism with lower belts 7. The spacing between belts 7 and 8 is adjustable, by means not shown in the drawing, to accommodate the thickness of the book blocks 1a being destacked.

The support frame 11 of exit conveyor 4 is mounted for pivoting about an axle 9. Accordingly, as will be described in more detail below, the upstream receiving end of exit conveyor 4 may be positioned such that the transport path defined by the upper run of lower belt 7 of the acquisition device and the roller conveyor 6 will be at or slightly below the level of the bottom of the product 1a which is at the moment located at the top of the stack remaining supported on the stationary roller conveyor 3. The vertical motion of the upstream end of exit conveyor 4, i.e., the conveyor end disposed oppositely with respect to the pivot axle 9, is controlled by means of an actuator 10.

A primary stop 13 is mounted from, and thus moves with, the upstream end of exit conveyor 4. Primary stop 13 extends into the destacking station and prevents motion, in the conveying direction, of the underlying book blocks during the separation operation to be described below. The stop 13 has an upper or push-off edge which will, at each vertical level where the receiving end of exit conveyor 4 is stopped to receive a block 1a, be positioned slightly below the plane in which the lower side of the book block 1a to be separated from the stack is located. An auxiliary stop 15, which is separately movable under the control of an actuator 14, is also provided at the destacking station. The auxiliary stop 15, which may be a finger which extends through conveyor 3 operates through the roller conveyor 3 and functions in the manner to be described below.

As will be understood and appreciated by those skilled in the art, the relative longitudinal positioning between exit conveyor 4, and particularly roller conveyor 6, and roller conveyor 3 may be adjusted to accommodate book blocks 1a of different size.

The separating mechanism 5, as indicated by the arrows on FIG. 1, will be moved in the upstream and downstream directions of book block motion, the motion being produced by means not shown. The separating mechanism 5 includes a pusher member 16 which is provided with a roller 17 at its lower end. The pusher member 16 has an appropriately shaped force transmitting surface which engages the trailing ends, i.e., the ends opposite to the spines, of the individual book blocks 1a which are to be pushed onto exit conveyor 4. The pusher member 16 also includes a foot portion which will rest on the upper surface of the book block 1a being pushed. In the disclosed embodiment, the pusher member 16 descends to the position shown, i.e., with the foot portion thereof on top of the book block 1a to be ejected and the force transmitting surface thereof behind the trailing edge of the book block, under the influence of gravity. The pusher member 16 will be returned to its vertical starting position, after all of the book blocks 1a of a stack 1 have been serially moved out of the destacking station, by means of an actuator 19.

In operation, during each return stroke of separating mechanism 5 after a book block 1a has been pushed forward to the point where it is engaged by the acquisition device defined by upper and lower transport belts 7 and 8, the pusher member 16 will automatically descend in two steps to the position where the next book block 1a can be separated from the stack 1. In the first step, the roller 17 will move into contact with and thereafter travel along the upper surface of the next book block 1a to be separated. The roller 17 ensures that, during the return stroke of the separating mechanism 5, the book block 1a will not be damaged, i.e., there will be no marks left on the product. In the second step of the descent, gravity will cause the pusher member 16 to drop to the position shown in broken lines in FIG. 1.

An accelerating roller is provided at the downstream end of the entry conveyor 2. Accelerating roller 20 cooperates with a counter-pressure roller 21 which is mounted on the end of a pivot arm. The purpose of the cooperating rollers 20, 21 is to engage and accelerate a book block stack 1 in order to establish a gap between the thus engaged book block stack and the following stack on the entry conveyor 2. This gap is necessary to enable the operation of a movable barrier 22 as shall be described below.

After the barrier 22 has been moved, by means not shown in the drawing, to release a stack 1 of book blocks 1a, the acceleration device comprising cooperating rollers 20 and 21 will be activated to drive the stack onto the destacking station roller conveyor 3. It will be understood that the belt comprising entry conveyor 2, the rollers 20 and 21 of the accelerating device and the roller conveyor 3 of the destacking station will be intermittently operated so as to not cause any frictional wear damage to the products being handled. The operation of the enumerated elements will be instituted in response to the sensing, by a photoelectric detector 24, of the lateral movement of the lowermost book block 1a of the stack previously delivered into the destacking station. The output signal of detector 24 will also be employed to cause the operation of the actuator 14 to raise the auxiliary stop 15. Accordingly, as the last book block 1a of the previous stack 1 is exiting the destacking station, a new stack 1 will be moving into position for destacking, and the forward motion of the new stack along the roller conveyor 3 will be arrested by the auxiliary stop 15.

As discussed above, during the above-described supply operation, a gap will be formed between the leading book block stack 1 on the entry conveyor 2 and the next succeeding stack 1. This gap is a result of the fact that the velocity imparted to a stack by the accelerating device, i.e., the cooperating rollers 20 and 21, exceeds the linear speed of the belt of conveyor 2. The gap will be sensed by a further photoelectric detector 23 which will provide an energizing signal for causing, after an appropriate time delay, the barrier 22 to be returned to the position shown in FIG. 1, the auxiliary stop 15 to be lowered and the motion of the intermittently operated components of the entry conveyor and the roller conveyor 3 to be terminated.

During the delivery of a new stack 1 into position at the destacking station, the separating mechanism 5 will have been returned to its upper, starting position. The return of the separating mechanism 5 to its starting position will be accomplished in response to the signal provided by detector 24 with appropriate time delay. With the separating mechanism 5 in its starting position, the pusher member 16 will engage the uppermost book block 1a and push this book block, spine first, across the push-off edge of the primary stop 13 and into the region where the book block will be acquired by the cooperating belts 7, 8 of the acquisition device of exit conveyor 4. The pivoting of the upstream end of exit conveyor 4 back to its starting position will begin immediately after the acquisition of the lowermost book block 1a of a stack previously positioned at the destacking station. Thus, the exit conveyor 4 will be in position to receive the uppermost book block of the newly delivered stack substantially simultaneously with the arrival of the new stack at the destacking station.

As the book blocks 1a are removed from the stack 1 positioned at the destacking station, in response to signals provided by a photoelectric detector 26, the upstream end of the exit conveyor 4 will be lowered in stepwise fashion by actuator 10, the exit conveyor pivoting about axle 9 during such lowering. Each step in the downward motion of the upstream end of exit conveyor 4 will correspond to the height of a book block 1a.

As noted above, operating in response to a signal provided by detector 24, the separating mechanism 5 is moved back to its upper travel-position while the last book block 1a of a stack 1 is being transported away from the destacking station. Simultaneously, as discussed above, the barrier 22 is withdrawn and the next book block stack 1 is delivered to the destacking station by means of activating the drive for the accelerating device comprising the cooperating rollers 20, 21, the entry conveyor 2 and the roller conveyor 3. The command signal for causing actuator 10 to return the exit conveyor 4 to its starting position is derived from detector 26 which will move with the exit conveyor 4.

Figure 2:
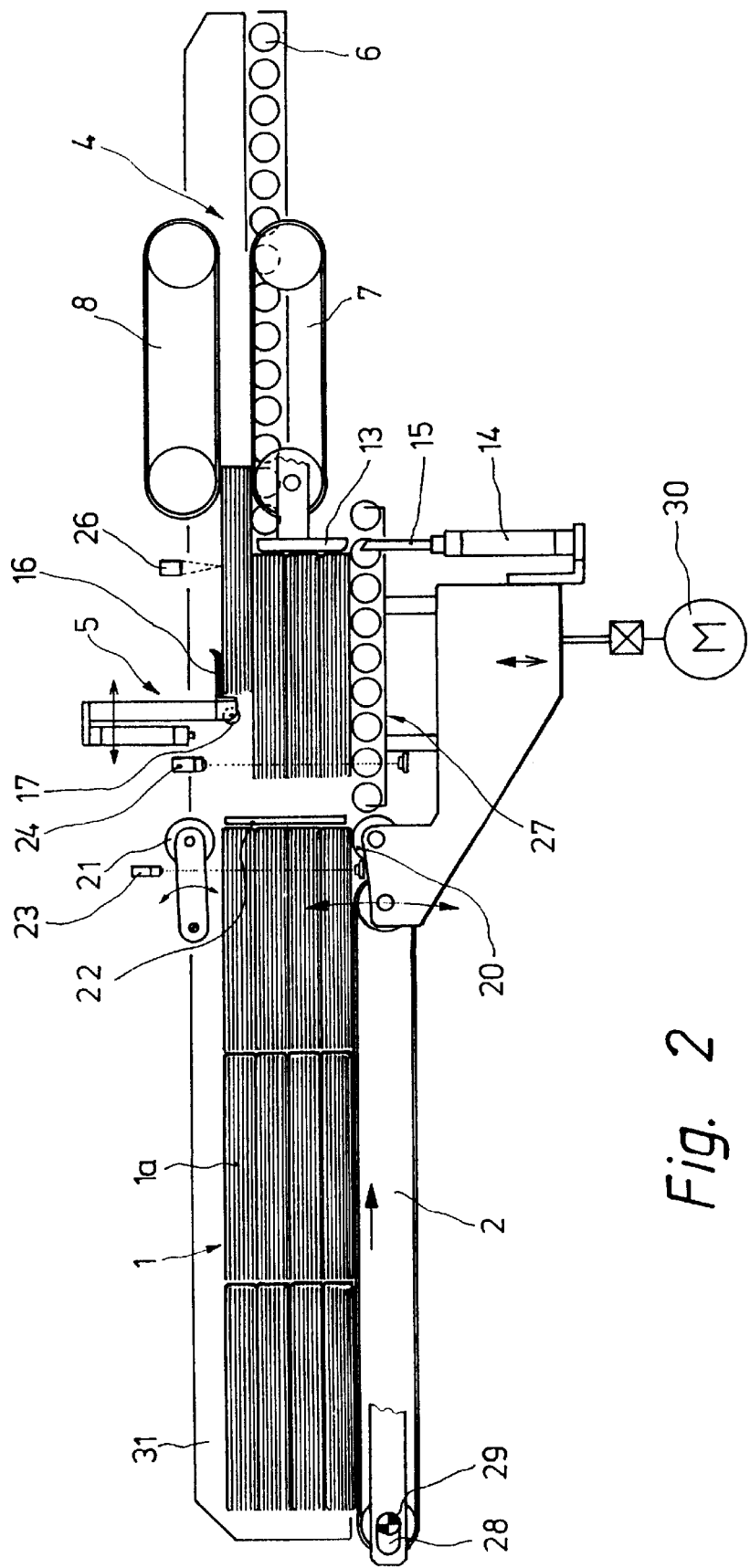
FIG. 2 is a view, similar to FIG. 1, depicting a second embodiment of the invention.

In the embodiment of FIG. 2, the position of the inclined transport path defined by exit conveyor 4 remains fixed and the upstream end of entry conveyor 2 is pivotal, about an axle 29, such that the inclination of the transport path defined thereby in the transport direction will vary in accordance with the height of the diminishing book block stack at the destacking station. Also in the FIG. 2 embodiment, the separating mechanism 5 operates in a single plane and is shifted from this plane only during the time a new book block stack 1 is delivered to the destacking station. This mode of operation results from the fact that a vertically movable roller conveyor 27, which is articulated to the downstream end of entry conveyor 2, is employed at the destacking station. The inclined plane defined by the upper surface of roller conveyor 27 will be raised and lowered. This vertical movement is produced by means of a drive mechanism which includes motor 30. The pivot axle 29 of entry conveyor 2 engages an elongated slot 28 in the conveyor frame so as to provide the necessary length compensation.

The FIG. 2 embodiment also includes an accelerating roller 20 installed between the belt of the entry conveyor 2 and the roller track 27. As in the FIG. 1 embodiment, the accelerating roller 20 cooperates with a counter-pressure roller 21.

In the operation of the FIG. 2 embodiment, after the barrier 22 has been withdrawn, a book block stack 1 will be delivered onto the roller track 27 of the destacking station from the entry conveyor 2 by the accelerating device comprising cooperating rollers 20, 21. A book block stack thus delivered to the destacking station will be stopped by auxiliary stop 15, in the manner described above in the discussion of the FIG. 1 embodiment, and the barrier 22 will be repositioned in front of the entry conveyor by sensing the gap which has been created between succeeding stacks by the acceleration device. The roller conveyor 27 and the belt of entry conveyor 2 will, in the same manner as the conveyors 2 and 3 of the FIG. 1 embodiment, be driven during the stack delivery operation. Thereafter, roller conveyor 27 will be moved upwardly, in stepwise fashion, such that the bottom edge of the book blocks 1a comprising a stack 1 will be serially positioned at a level which is slightly above the push-off edge of the primary stop 13. Restated, after each separation operation, a height adjustment is effected under the control of sensor 26 to match the level of the roller conveyor 27 to that of the transport path defined by exit conveyor 4. The separating mechanism 5, particularly the pusher member 16, will engage the uppermost book block 1a and push the book block forward so that it can be acquired and transported onward by the cooperating belts 7, 8 of the acquisition device of exit conveyor 4.

When a stack change takes place, the forward movement of the next incoming stack via the entry conveyor 2 and the accelerating device 20, 21 begins substantially simultaneously with the stroke of the separating mechanism 5 which pushes the last book block 1a off roller conveyor 27. This motion continues until contact is established with the auxiliary stop 15. The auxiliary stop 15 and its actuator 14 move with the roller track 27 and the in-feed of the new stack 1 will occur while the discharge end of entry conveyor 2 and roller conveyor 27 are being returned to their starting positions. As the apparatus is shown in FIG. 2, the return motion is downward for conveyor 27 and clockwise for the downstream end of conveyor 2.

While preferred embodiments have been shown and described, various modifications and substitutions may be made thereto without departing from the spirit and scope of the invention. For example, rather than employ a mechanical separating device with a pusher member, it is within the capability of those skilled in the art to employ a vacuum-type separating system which may, for example, utilize telescopic suction elements. It will also be understood by those skilled in the art that the operation of the disclosed apparatus, as described above, may be reversed whereby the apparatus can be utilized for stacking rather than destacking. Accordingly, it is to be understood that the present invention has been described by way of illustration and not limitation.

What is claimed is:

1. In an apparatus for transporting printing works products, the products comprising partially or completely finished books, said transporting apparatus including the capability of altering the arrangement of the transported products between generally vertically arranged stacks of products and individual products, the improvement comprising:

first conveyor means for transporting stacks of the said products;

second conveyor means for transporting individual of the said products as a serial stream of products;

means positioned intermediate said first and second conveyor means for supporting a stack of products, said supporting means including means for controlling the motion of the uppermost product in a stack between a position on a supported stack of products and a position on said second conveyor means;

means for adjusting the vertical relationship between said supporting means and the end of said second conveyor means which is located in closest proximity to said supporting means, said adjusting means causing the vertical position of the uppermost product of the stack of products on said supporting means to be commensurate with the vertical portion of said end of said second conveyor means; and means for moving a stack of products between said first conveyor means and said supporting means simultaneously with the controlled motion of the lowermost product of a stack between said supporting means and said second conveyor means.

2. The apparatus of claim 1 wherein said second conveyor means includes acquisition means for gripping and imparting motion to a said product.

3. The apparatus of claim 2 wherein said motion controlling means of said supporting means comprises means for engaging the individual products and applying a lateral force thereto to cause the engaged product to move in the direction of said acquisition means.

4. The apparatus of claim 3 wherein said engaging means operates in a plane and the mean vertical position of said operating plane is reduced in stepwise fashion as the number of products in the stack on said supporting means is reduced.

5. The apparatus of claim 4 wherein said acquisition means comprises a spaced pair of upper and lower belts and wherein said second conveyor further comprises a conveyor which receives products discharged from said acquisition means.

6. The apparatus of claim 4 wherein said engaging means comprises:

a pusher member, said pusher member being supported for downward motion under the influence of gravity; and means for imparting reciprocal motion to said pusher element in a direction which is generally transverse to the direction of said downward motion.

7. The apparatus of claim 5 wherein said engaging means comprises:

a pusher member, said pusher member being supported for downward motion under the influence of gravity; and means for imparting reciprocal motion to said pusher element in a direction which is generally transverse to the direction of said downward motion.

8. In an apparatus for transporting printing works products, the products comprising partially or completely finished books, said transporting apparatus including the capability of altering the arrangement of the transported products between generally vertically arranged stacks of products and individual products, the improvement comprising:

first conveyor means for transporting stacks of the said products, said first conveyor means including means for engaging and accelerating the motion of a stack of products being transported thereby, said accelerating means separating the stack of products engaged thereby from the next succeeding stack of products on said first conveyor means;

second conveyor means for transporting individual of the said products as a serial stream of products, said second conveyor means including acquisition means for gripping and imparting motion to a said product being transported thereby;

means positioned intermediate said first and second conveyor means for supporting a stack of products, said first conveyor means accelerating means delivering a stack of products onto said supporting means, said supporting means including means for controlling the motion of the uppermost product in a stack between a position on a supported stack of products and a position on said second conveyor means, said motion controlling means comprising means for engaging an individual product and applying a lateral force thereto to cause the engaged product to move in the direction of said acquisition means, said engaging means operating in a plane; and means for adjusting the vertical relationship between said supporting means and the end of said second conveyor means which is located in closest proximity to said supporting means, said adjusting means causing the mean vertical position of said engaging means operating plane to be reduced in stepwise fashion as the number of products in the stack on said supporting means is reduced whereby the vertical position of the uppermost product of the stack of products on said supporting means will be commensurate with the vertical position of said end of said second conveyor means;

the stack of products delivered from said first conveyor means to said supporting means being engaged by said accelerating means and moved simultaneously with the controlled motion of the lowermost product of a stack between said supporting means and said second conveyor means.

9. The apparatus of claim 8 wherein said supporting means includes retractable stop means for arresting the movement of a stack of products delivered onto said supporting means from said first conveyor means.

10. The apparatus of claim 8 wherein said means for moving a stack of products comprises:

a retractable barrier for selectively preventing the delivery of product stacks to said supporting means; and means for retracting said barrier from and reinserting said barrier into the path of product stack motion on said first conveyor means respectively in response to the lateral movement of the lowermost product of a stack previously delivered to said supporting means and the sensing of a spacial separation between a stack of products engaged by said accelerating means and the next succeeding stack of products on said first conveyor means.

11. The apparatus of claim 9 wherein said supporting means further includes a roller type conveyor.

12. In an apparatus for transporting printing works products, the products comprising partially or completely finished books, said transporting apparatus including the capability of altering the arrangement of the transported products between generally vertically arranged stacks of products and individual products, the improvement comprising:

first conveyor means for transporting stacks of the said products, said first conveyor means including means for engaging and accelerating the motion of a stack of products, said accelerating means separating the stack of products engaged thereby from the next succeeding stack of products on said first conveyor means;

second conveyor means for transporting individual of the said products as a serial stream of products, said second conveyor means including acquisition means for gripping and imparting motion to a said product, said acquisition means comprising a spaced pair of upper and lower belts and wherein said second conveyor means further comprises a conveyor which receives products discharged from said acquisition means;

means positioned intermediate said first and second conveyor means for supporting a stack of products, said first conveyor means accelerating means delivering a stack of products onto said supporting means, said supporting means including means for controlling the motion of the uppermost product in a stack between a position on a supported stack of products and a position on said second conveyor means, said motion controlling means comprising means for engaging an individual product and applying a lateral force thereto to cause the engaged product to move in the direction of said acquisition means, said engaging means comprising a pusher member, said pusher member being supported for downward motion under the influence of gravity, said engaging means further comprising means for imparting reciprocal motion to said pusher element in a direction which is generally transverse to the direction of said downward motion, said engaging means operating in a plane; and means for adjusting the vertical relationship between said supporting means and the end of said second conveyor means which is located in closest proximity to said supporting means, said adjusting means causing the mean vertical position of said engaging means operating plane to be reduced in stepwise fashion as the number of products in the stack on said supporting means is reduced whereby the vertical position of the uppermost product of the stack of products on said supporting means will be commensurate with the vertical position of said end of said second conveyor means;

the stack of products delivered from said first conveyor means to said supporting means being moved simultaneously with the controlled motion of the lowermost product of a stack between said supporting means and second conveyor means.

13. The apparatus of claim 12 wherein said supporting means includes retractable stop means for arresting the movement of a stack of products delivered onto said supporting means from said first conveyor means.

14. The apparatus of claim 13 wherein said means for moving a stack of products comprises:

a retractable barrier for selectively preventing the delivery of product stacks to said supporting means; and means for retracting said barrier from and reinserting said barrier into the path of product stack motion on said first conveyor means respectively in response to the lateral movement of the lowermost product of a stack previously delivered to said supporting means and the sensing of a spacial separation between a stack of products engaged by said accelerating means and the next succeeding stack of products on said first conveyor means.

15. In an apparatus for transporting printing works products, the products comprising partially or completely finished books, said transporting apparatus including the capability of altering the arrangement of the transported products between generally vertically arranged stacks of products and individual products, the improvement comprising:

first conveyor means for transporting stacks of the said products;

second conveyor means for transporting individual of the said products as a serial stream of products;

means positioned intermediate said first and second conveyor means for supporting a stack of products, said supporting means including means for controlling the motion of the uppermost product in a stack between a position on a supported stack of products and a position on said second conveyor means, said supporting means defining a planar support surface;

means for adjusting the vertical relationship between said supporting means planar support surface and the end of said second conveyor means which is located in closest proximity to said supporting means, said adjusting means causing the vertical position of the uppermost product of the stack of products on said supporting means to be commensurate with the vertical position of said end of said second conveyor means, said vertical relationship adjusting means engaging said first conveyor means and causing said supporting means planar support surface and the end of said first conveyor means located in closest proximity to said supporting means to simultaneously move vertically; and means for moving a stack of products between said first conveyor means and said supporting means simultaneously with the controlled motion of the lowermost product of a stack between said supporting means and said second conveyor means.

16. The apparatus of claim 15 wherein said second conveyor means includes acquisition means for gripping and imparting motion to a said product in a direction away from said supporting means.

17. The apparatus of claim 16 wherein said motion controlling means of said supporting means comprises means for engaging the individual product and applying a lateral force thereto to cause an engaged product to move in the direction of said acquisition means.

18. The apparatus of claim 17 wherein said engaging means operates in a fixed plane and includes:

a pusher member; and means for imparting reciprocal motion to said pusher member.

19. The apparatus of claim 18 wherein said first conveyor means includes:

means for contacting and accelerating the motion of a stack of products onto said supporting means, said accelerating means separating the stack being delivered onto said supporting means from the next succeeding stack of products on said first conveyor means.

20. The apparatus of claim 19 wherein said means for moving a stack of products comprises:

a retractable barrier for selectively preventing the delivery of product stacks to said supporting means; and means for retracting said barrier from and reinserting said barrier into the path of product stack motion on said first conveyor means respectively in response to the lateral movement of the lowermost product of a stack previously delivered to said supporting means and the sensing of a spacial separation between a stack of products engaged by said accelerating means and the next succeeding stack of products on said first conveyor means; and wherein said supporting means includes:

retractable stop means for arresting the motion of a stack of products delivered onto said supporting means, said stop means moving with said planar support surface.

* * * * *